United States Patent
Kessler et al.

(10) Patent No.: US 11,927,398 B2
(45) Date of Patent: Mar. 12, 2024

(54) COOLING APPARATUS FOR A MEDIUM VOLTAGE OR HIGH VOLTAGE SWITCHGEAR

(71) Applicant: ABB Schweiz AG, Baden (CH)

(72) Inventors: Michael Kessler, Heiligenhaus (DE); Oleksandr Sologubenko, Bonstetten (DE); Jaroslav Hemrle, Baden-Daettwil (CH); Andrzej Rybak, Cracow (PL); Adam Michalik, Bibice (PL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/530,536

(22) Filed: Nov. 19, 2021

(65) Prior Publication Data
US 2022/0074672 A1 Mar. 10, 2022

Related U.S. Application Data

(63) Continuation of application No. PCT/EP2020/063502, filed on May 14, 2020.

(30) Foreign Application Priority Data

May 20, 2019 (EP) ..................... 19175434

(51) Int. Cl.
*F28D 15/02* (2006.01)
*F28D 15/04* (2006.01)
(Continued)

(52) U.S. Cl.
CPC ......... *F28D 15/0275* (2013.01); *F28D 15/04* (2013.01); *H01H 1/62* (2013.01); *H01H 9/52* (2013.01); *H02B 1/56* (2013.01)

(58) Field of Classification Search
CPC ....... F28D 15/0275; F28D 15/04; H01H 1/62; H01H 9/52; H02B 1/56
(Continued)

(56) References Cited

U.S. PATENT DOCUMENTS 2,879,366 A * 3/1959 Tudbury ................. H05B 6/36
336/62
3,728,585 A 4/1973 Olashaw
(Continued)

FOREIGN PATENT DOCUMENTS

EP 2154700 A1 2/2010
EP 2256767 A2 12/2010
(Continued)

OTHER PUBLICATIONS

European Patent Office, Extended European Search Report in European Patent Application No. 19175434.0, 4 pp. (dated Nov. 22, 2019).
(Continued)

*Primary Examiner* — Anatoly Vortman
(74) *Attorney, Agent, or Firm* — Leydig, Voit & Mayer, Ltd.

(57) ABSTRACT

A cooling apparatus for a medium voltage or high voltage switchgear includes an evaporator, a fluid conduit, and a condenser. The evaporator is configured to surround at least part of a current carrying contact. The fluid conduit fluidly connects the evaporator to the condenser. A section of the fluid conduit is formed within the evaporator and is electrically insulating and is configured such that fluid can contact an outer surface of the current carrying contact. The cooling apparatus is configured such that in use a working fluid in the evaporator is heated to a vapour state, and the vapour is transferred by the fluid conduit to the condenser. The vapour in the condenser is condensed to the working fluid. The condensed working fluid is passively returned via the fluid conduit to the evaporator.

8 Claims, 4 Drawing Sheets

(51) Int. Cl.
*H01H 1/62* (2006.01)
*H01H 9/52* (2006.01)
*H02B 1/56* (2006.01)

(58) Field of Classification Search
USPC ........................................................ 165/80.4
See application file for complete search history.

(56) References Cited

U.S. PATENT DOCUMENTS

| | | | |
|---|---|---|---|
| 3,764,765 | A | 10/1973 | Olashaw |
| 3,769,551 | A | 10/1973 | Corman et al. |
| 4,005,297 | A | 1/1977 | Cleaveland |
| 4,358,631 | A | 11/1982 | Matsuda |
| 4,964,457 | A * | 10/1990 | Leonard ............... F28D 15/046 165/274 |
| 6,574,094 | B1 | 6/2003 | Morrow et al. |
| 7,253,379 | B2 | 8/2007 | Lakner et al. |
| 7,471,495 | B2 | 12/2008 | Steffens et al. |
| 7,557,295 | B2 | 7/2009 | Kiefer et al. |
| 7,771,114 | B2 | 8/2010 | Kiefer et al. |
| 7,881,033 | B2 | 2/2011 | Chartouni et al. |
| 8,695,358 | B2 | 4/2014 | Kaufmann et al. |
| 8,699,210 | B2 * | 4/2014 | Aiello .................... H05K 7/20 361/677 |
| 8,711,550 | B2 | 4/2014 | Frigiere et al. |
| 8,717,745 | B2 | 5/2014 | Frigiere et al. |
| 8,717,746 | B2 * | 5/2014 | Kaufmann ............. H02G 5/10 361/624 |
| 9,736,967 | B2 | 8/2017 | Molitor et al. |
| 9,867,316 | B2 | 1/2018 | Kaufmann et al. |
| 9,906,001 | B2 | 2/2018 | Karandikar et al. |
| 10,178,803 | B2 * | 1/2019 | Dixit .................. H05K 7/20936 |
| 10,855,060 | B2 * | 12/2020 | Kaufmann ............... H02B 1/56 |
| 2008/0049384 | A1 | 2/2008 | Unternaehrer et al. |
| 2011/0180292 | A1 | 7/2011 | Widmer et al. |
| 2012/0205074 | A1 | 8/2012 | Frigiere et al. |
| 2013/0250490 | A1 | 9/2013 | Kaufmann et al. |
| 2017/0265329 | A1 * | 9/2017 | Dixit .................. H05K 7/20136 |

FOREIGN PATENT DOCUMENTS

| | | |
|---|---|---|
| WO | WO 2012161930 A1 | 11/2012 |
| WO | WO 2013139666 A1 | 9/2013 |
| WO | WO 2013139942 A1 | 9/2013 |
| WO | WO 2015018443 A1 | 2/2015 |

OTHER PUBLICATIONS

European Patent Office, International Preliminary Report on Patentability in International Patent Application No. PCT/EP2020/063502, 8 pp. (dated Nov. 16, 2021).

European Patent Office, International Search Report in International Patent Application No. PCT/EP2020/063502, 3 pp. (dated Oct. 14, 2020).

European Patent Office, Written Opinion in International Patent Application No. PCT/EP2020/063502, 7 pp. (dated Oct. 14, 2020).

Kitzrow et al., "Studies on the use of heat pipes in medium voltage switchgears," *27th International Conference on Electrical Contacts*, 546-551 (Jun. 22-26, 2014).

* cited by examiner

COOLING APPARATUS FOR A MEDIUM VOLTAGE OR HIGH VOLTAGE SWITCHGEAR

CROSS-REFERENCE TO PRIOR APPLICATIONS

This application is a continuation of International Patent Application No. PCT/EP2020/063502, filed on May 14, 2020, which claims priority to European Patent Application No. EP 19175434.0, filed on May 20, 2019. The entire disclosure of both applications is hereby incorporated by reference herein.

FIELD

One or more embodiments of the present invention may relate cooling apparatuses for a medium voltage or high voltage switchgear, methods of cooling at least one part of a medium voltage or high voltage switchgear with a cooling apparatus, and a method of forming an evaporator section of a cooling apparatus for a medium voltage or high voltage switchgear.

BACKGROUND

As compartments of gas insulated switchgears are fully sealed, heat dissipation due to losses is one of the major tasks of thermal management of the panel. For high current ratings in medium voltage switchgears passive cooling elements are used such as heat sinks or gas coolers. A more compact solution with very high efficiency consists of heat pipes. They are able to deduct heat from a dedicated hot spot to areas with lower temperature. Usually heat pipes consists of metallic tubes that provide an excellent tightness for fluids and gases and are also able to manage pressure increases in the tube during operation.

WO2013/139666A1 describes a cooling apparatus for a switchgear. The switchgear has one or more primary contacts constructed and arranged to connect to a terminal of a circuit breaker. The cooling apparatus includes an evaporator constructed and arranged to be associated with each primary contact. A condenser is located at a higher elevation than the evaporator. Fluid conduit structure fluidly connects the evaporator with the condenser. A portion of the fluid conduit structure defines a busbar tube electrically connected with an associated primary contact and defining a busbar of the switchgear. Working fluid is in the evaporator so as to be heated to a vapour state, with the fluid conduit structure being constructed and arranged to transfer the vapour to the condenser and to passively return condensed working fluid back to the evaporator for cooling the at least one primary contact and the associated busbar tube.

U.S. Pat. No. 6,574,094B1 describes a method for cooling bus bars in order to increase their current-carrying capacity while saving space and weight. The method comprises the steps of providing a housing having an interior wall; locating a distribution manifold within the housing, the distribution manifold comprising a hollow bus bar; communicating to the manifold a supply of an evaporative coolant; and delivering the coolant outwardly under pressure so that upon exiting the manifold, the coolant undergoes a phase change from the liquid to the vapor state. Heat is extracted from the manifold at least as quickly as heat is generated by the flow of current. The extraction of heat by the flow of coolant and evaporation maintains or lowers the temperature of the bus bar and enables a given size of bus bar to carry more current without a significant rise in temperature.

WO2013/139942A1 describes a cooling apparatus is for a switchgear having at least one primary contact to connect to a terminal of a circuit breaker, with a busbar joint connected to the primary contact. The cooling apparatus includes an evaporator associated with the primary contact. A condenser is located at a higher elevation than the evaporator. Heat pipe structure fluidly connects the evaporator with the condenser. Heat transfer structure is coupled with the busbar joint for removing heat from the busbar joint. Working fluid is in the evaporator so as to be heated to a vapor state, with the heat pipe structure transferring the vapor to the condenser and passively returning condensed working fluid back to the evaporator for cooling the at least one primary contact.

WO2012/161930A1 describes a cooling apparatus for cooling a switchgear. The switchgear has one or more primary contacts supported by a bushing and constructed and arranged to connect to a terminal of a circuit breaker. The cooling apparatus includes at least one evaporator associated with each primary contact, a condenser apparatus located at a higher elevation than the at least one evaporator, fluid conduit structure connecting the at least one evaporator with the condenser apparatus, and electrically insulating working fluid in at least one evaporator so as to be heated to a vapor state, with the fluid conduit structure being constructed and arranged to transfer the vapor to the condenser apparatus and to passively return condensed working fluid back to the at least one evaporator.

WO2015/018443A1 describes a cooling apparatus cooling for an electrical or electronic device, comprising an at least partially hollow body containing a refrigerant and having a plurality of electrically conductive sections Each electrically conductive section has a respective coupling portion suitable to be operatively associated with a corresponding electrically conductive part of the electrical or electronic device, wherein the at least partially hollow body further comprises one or more electrically insulating sections. Each electrically insulating section is positioned between and electrically insulates from each other two adjacent electrically conductive sections.

Usually metallic tubes of heat pipes cannot be connected directly to the hot spots on the current path due to dielectric reasons. Solutions that require that all parts stay inside the gas compartment usually cannot provide good cooling efficiency as the gas flow is limited inside a small, fully sealed compartment as is the case in medium voltage (MV) gas insulated switchgear (GIS). The highest efficiency can be obtained if there is a direct connection of the hot end of the heat pipe to the metallic part of the current leading path and the cold end of the heat pipes is placed outside the compartment. However, in this case an electrically insulating part must be integrated into the pipe. This then precludes using conventional heat pipes with capillary-driven liquid return, because the metallic wick has to be interrupted at the insulating part. Instead, gravity-driven heat pipes (normally called thermosyphons) have to be used, as schematically illustrated in FIG. 1. Thus, the heat pipe does not consists of one piece but of several parts, which must be gas tight connected. In addition a gas tight bushing through the sidewall of the switchgear is needed, leading to additional costs and assembling time.

There is a need to address these issues.

SUMMARY

One or more embodiments of the present invention may provide a cooling apparatus for a medium voltage or high voltage switchgear. The cooling apparatus may include an evaporator, a fluid conduit, and a condenser, wherein, the evaporator is configured to surround at least part of a current carrying contact, wherein, the fluid conduit fluidly connects the evaporator to the condenser, wherein, a section of the fluid conduit is formed within the evaporator and is electrically insulating and is configured such that fluid can contact an outer surface of the current carrying contact, and wherein, the cooling apparatus is configured such that in use a working fluid in the evaporator is heated to a vapour state, and wherein the vapour is transferred by the fluid conduit to the condenser, and wherein the vapour in the condenser is condensed to the working fluid, and wherein the condensed working fluid is passively returned via the fluid conduit to the evaporator.

One or more embodiments of the present invention may provide a cooling apparatus for a medium voltage or high voltage switchgear. The cooling apparatus may include an evaporator, two fluid conduits, and a condenser, wherein, the evaporator is configured to surround at least part of a current carrying contact, wherein, each of the two fluid conduits fluidly connects the evaporator to the condenser, wherein, a section of each of the two fluid conduits is formed within the evaporator and each is electrically insulating and each is configured such that fluid can contact an outer surface of the current carrying contact, and wherein, the cooling apparatus is configured such that in use a working fluid in the evaporator is heated to a vapour state, and wherein the vapour is transferred by a first fluid conduit of the two fluid conduits to the condenser, and wherein the vapour in the condenser is condensed to the working fluid, and wherein the condensed working fluid is passively returned via a second fluid conduit of the two fluid conduits to the evaporator.

One or more embodiments of the present invention may provide a method of cooling at least one part of a medium voltage or high voltage switchgear with a cooling apparatus. The cooling apparatus may include an evaporator, a fluid conduit, and a condenser, wherein, the evaporator is configured to surround at least part of a current carrying contact, wherein, the fluid conduit fluidly connects the evaporator to the condenser, wherein, a section of the fluid conduit is formed within the evaporator and is electrically insulating and is configured such that fluid can contact an outer surface of the current carrying contact. The method may include heating a working fluid in the evaporator to a vapour state; transferring the vapour by the fluid conduit to the condenser; condensing the vapour in the condenser to the working fluid; and passively returning the condensed working fluid via the fluid conduit to the evaporator.

One or more embodiments of the present invention may provide a method of cooling at least one part of a medium voltage or high voltage switchgear with a cooling apparatus. The cooling apparatus comprising: may include an evaporator; two fluid conduits; and a condenser, wherein, the evaporator is configured to surround at least part of a current carrying contact, wherein, each of the two fluid conduits fluidly connects the evaporator to the condenser, wherein, a section of each of the two fluid conduits is formed within the evaporator and each is electrically insulating and each is configured such that fluid can contact an outer surface of the current carrying contact. The method may include: heating a working fluid in the evaporator to a vapour state; transferring the vapour by a first fluid conduit of the two fluid conduits to the condenser; condensing the vapour in the condenser to the working fluid; and passively returning the condensed working fluid via a second fluid conduit of the two fluid conduits to the evaporator.

One or more embodiments of the present invention may provide a method of forming an evaporator of a cooling apparatus for a medium voltage or high voltage switchgear. The cooling apparatus may include the evaporator, at least one fluid conduit, and a condenser; wherein the evaporator is configured to surround at least part of a current carrying contact, and wherein the at least one fluid conduit fluidly connects the evaporator to the condenser; and wherein the method of forming the evaporator may include forming a section of the at least one fluid conduit within the evaporator that is electrically insulating.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
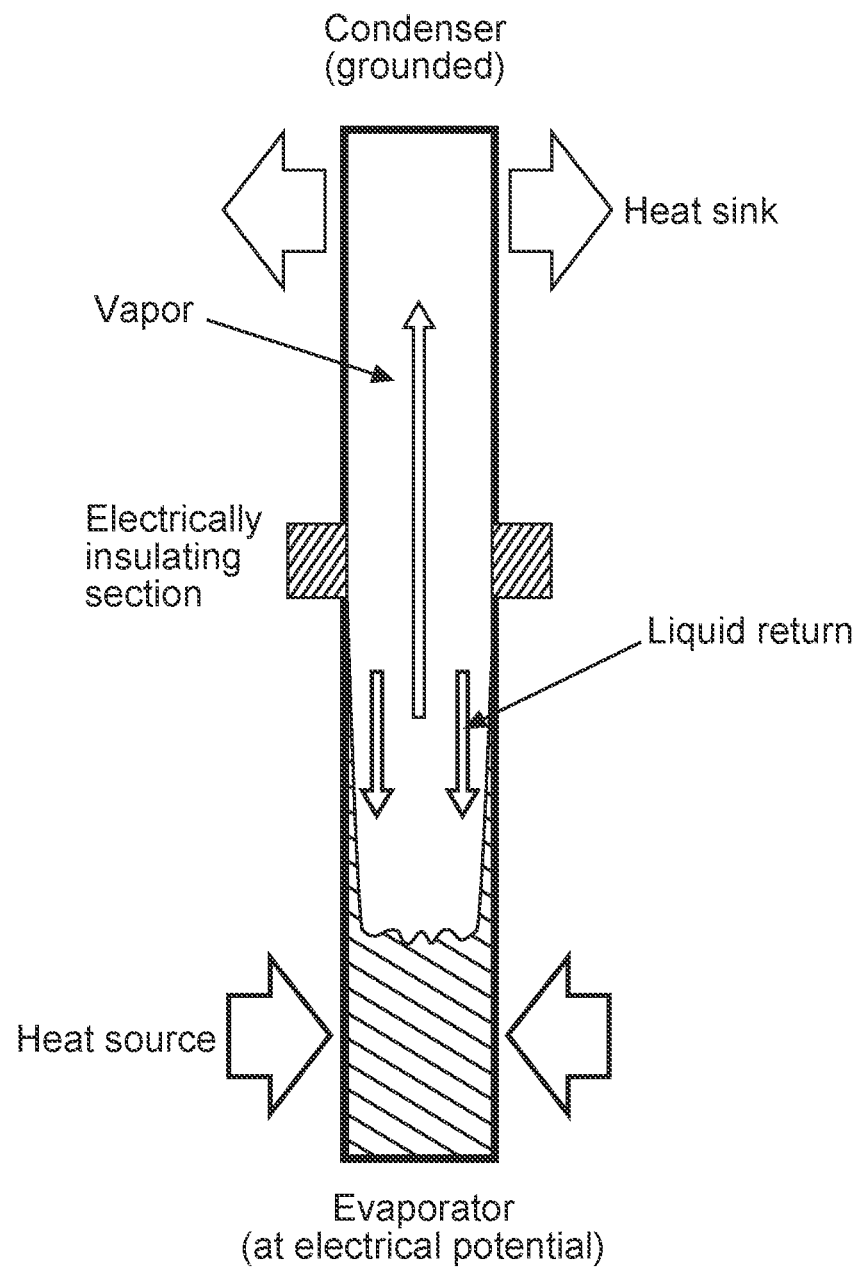
FIG. 1 shows a schematic illustration of a thermosyphon for cooling of heat sources at an electrical potential.

Therefore, it would be advantageous to have an improved technique to cool internal parts of a medium voltage or high voltage switchgear that become hot due to current flow.

In a first aspect, there is provided a cooling apparatus for a medium voltage or high voltage switchgear, the cooling apparatus comprising:

an evaporator section;

a fluid conduit; and a condenser section.

The evaporator section is configured to surround at least part of a current carrying contact. The fluid conduit fluidly connects the evaporator section to the condenser section. A section of the fluid conduit is formed within the evaporator section and is electrically insulating and is configured such that fluid can contact an outer surface of the current carrying contact. The cooling apparatus is configured such that in use a working fluid in the evaporator section is heated to a vapour state. The vapour is transferred by the fluid conduit to the condenser. The vapour in the condenser section is condensed to the working fluid. The condensed working fluid is passively returned via the fluid conduit to the evaporator section.

In this way, the cooling apparatus can cool the current carrying contact of a medium voltage or high voltage switchgear.

Thus, a heat pipe or thermosyphon is provided where the condensing section can be outside the switchgear enclosure or have a part outside the enclosure or be part of the other surface of the enclosure and no specific extra insulating part needs to be integrated into the fluid conduit. This is because although the current carrying part is at high voltage, because the fluid conduit is inherently electrically insulating at the evaporator section of the cooling apparatus, the fluid conduit is not raised to high potential and the condenser section can be maintained at the potential of the enclosure of the switchgear, for example ground potential.

In an example, the cooling apparatus comprises the current carrying contact. The evaporator section surrounds and is fixedly attached to an outer surface of the current carrying contact.

Thus, the evaporator section can be integrated with the current carrying contact to form for example a busbar bushing.

In an example, a metallic wick is comprised within the fluid conduit.

Thus, because the fluid conduit is not raised to high potential, a wick can be placed in the fluid conduit, and the passive return of the condensed working fluid from the condenser section to the evaporator section can make use of capillary action. Thus, not only is the efficiency of passive return of fluid increased, the condenser section need not be placed above the evaporator section.

In an example, the condenser section is located at a higher elevation than the evaporator section.

Thus, the cooling apparatus can be a thermosyphon system where gravity is used to passively return condensed working fluid to the evaporator. The thermosyphon functioning can however be augmented via capillary action if necessary.

In an example, the evaporator section is electrically insulating.

Thus, a hollow conduit within the evaporator section itself can be used to form the electrically insulating section of the fluid conduit.

In an example, a fluid channel surrounds the current carrying contact. The fluid channel is configured such that the working fluid can contact an outer surface of the current carrying contact that extends around the current carrying contact. The fluid channel fluidly connects to the fluid conduit.

In this way, cooling of the current carrying contact is further improved, because the working fluid can be heated and turned into the vapour state at a surface encircling the current carrying contact.

In a second aspect, there is provided a cooling apparatus for a medium voltage or high voltage switchgear, the cooling apparatus comprising:
  an evaporator section;
  two fluid conduits; and
  a condenser section.

The evaporator section is configured to surround at least part of a current carrying contact. Each of the two fluid conduits fluidly connects the evaporator section to the condenser section. A section of each of the two fluid conduits is formed within the evaporator section and each is electrically insulating and each is configured such that fluid can contact an outer surface of the current carrying contact. The cooling apparatus is configured such that in use a working fluid in the evaporator section is heated to a vapour state. The vapour is transferred by a first fluid conduit of the two fluid conduits to the condenser section. The vapour in the condenser section is condensed to the working fluid. The condensed working fluid is passively returned via a second fluid conduit of the two fluid conduits to the evaporator section.

In this way, the cooling apparatus can cool the current carrying contact of a medium voltage or high voltage switchgear, and efficiency of cooling is improved because by having two fluid conduits a circulation of the liquid and gaseous phase of the working fluid is enabled.

In an example, the cooling apparatus comprises the current carrying contact. The evaporator section surrounds and is fixedly attached to an outer surface of the current carrying contact.

Thus, the evaporator section can be integrated with the current carrying contact to form for example a busbar bushing.

In an example, a metallic wick is comprised within the second of the two fluid conduits.

Thus, because the fluid conduit is not raised to high potential, a wick can be placed in the fluid conduit, and the passive return of the condensed working fluid from the condenser section to the evaporator section can make use of capillary action. Thus, not only is the efficiency of passive return of fluid increased, the condenser section need not be placed above the evaporator section.

In an example, a fluid channel surrounds the current carrying contact. The fluid channel is configured such that the working fluid can contact an outer surface of the current carrying contact that extends around the current carrying contact, and wherein the fluid channel fluidly connects to the two fluid conduits.

In a third aspect, there is provided a method of cooling at least one part of a medium voltage or high voltage switchgear with a cooling apparatus. The cooling apparatus comprises: an evaporator section; a fluid conduit; and a condenser section. The evaporator section is configured to surround at least part of a current carrying contact. The fluid conduit fluidly connects the evaporator section to the condenser section. A section of the fluid conduit is formed within the evaporator section and is electrically insulating and is configured such that fluid can contact an outer surface of the current carrying contact; and wherein, the method comprises:
  heating a working fluid in the evaporator section to a vapour state;
  transferring the vapour by the fluid conduit to the condenser section;
  condensing the vapour in the condenser section to the working fluid; and
  passively returning the condensed working fluid via the fluid conduit to the evaporator section.

In an example, a fluid channel surrounds the current carrying contact. The fluid channel is configured such that the working fluid can contact an outer surface of the current carrying contact that extends around the current carrying contact. The fluid channel fluidly connects to the fluid conduit. The method comprises heating the working fluid in the fluid channel to the vapour state.

In a fourth aspect, there is provided a method of cooling at least one part of a medium voltage or high voltage switchgear with a cooling apparatus. The cooling apparatus comprises: an evaporator section; two fluid conduits; and a condenser section. The evaporator section is configured to surround at least part of a current carrying contact. Each of the two fluid conduits fluidly connects the evaporator section to the condenser section. A section of each of the two fluid conduits is formed within the evaporator section and each is electrically insulating and each is configured such that fluid can contact an outer surface of the current carrying contact. The method comprises:
  heating a working fluid in the evaporator section to a vapour state;
  transferring the vapour by a first fluid conduit of the two fluid conduits to the condenser section;
  condensing the vapour in the condenser section to the working fluid; and passively returning the condensed working fluid via a second fluid conduit of the two fluid conduits to the evaporator section.

In an example, a fluid channel surrounds the current carrying contact. The fluid channel is configured such that the working fluid can contact an outer surface of the current carrying contact that extends around the current carrying contact. The fluid channel fluidly connects to the two fluid conduits. The method comprises heating the working fluid in the fluid channel to the vapour state.

In a fifth aspect, there is provided a method of forming an evaporator section of a cooling apparatus for a medium voltage or high voltage switchgear. The cooling apparatus comprises: the evaporator section, at least one fluid conduit, and a condenser section. The evaporator section is configured to surround at least part of a current carrying contact. The at least one fluid conduit fluidly connects the evaporator section to the condenser section. The method of forming the evaporator section comprises:

forming a section of the at least one fluid conduit within the evaporator section that is electrically insulating.

The above aspects and examples will become apparent from and be elucidated with reference to the embodiments described hereinafter.

Figure 2:
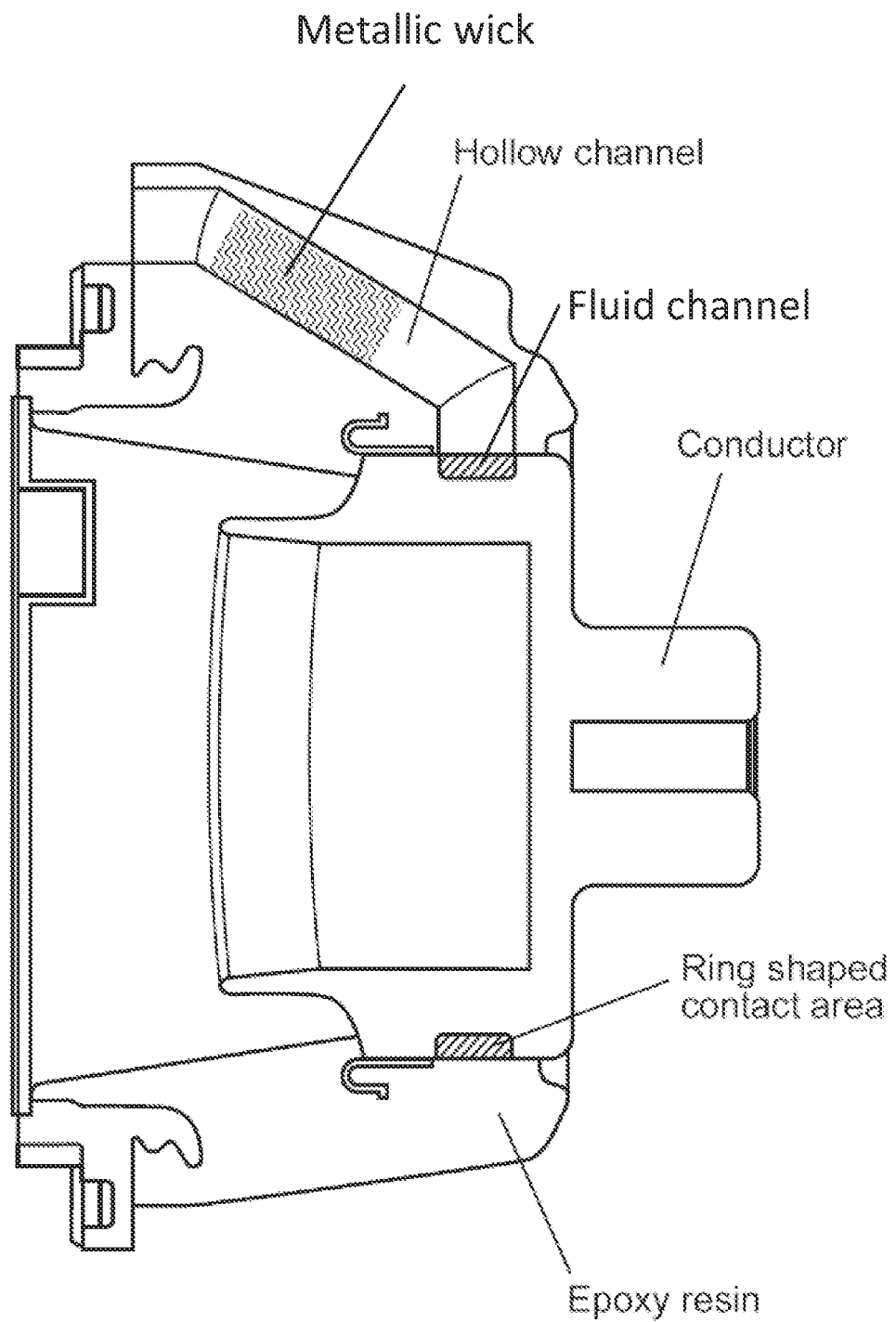
FIG. 2 shows an example of an evaporation section surrounding a current carrying contact.
Figure 3:
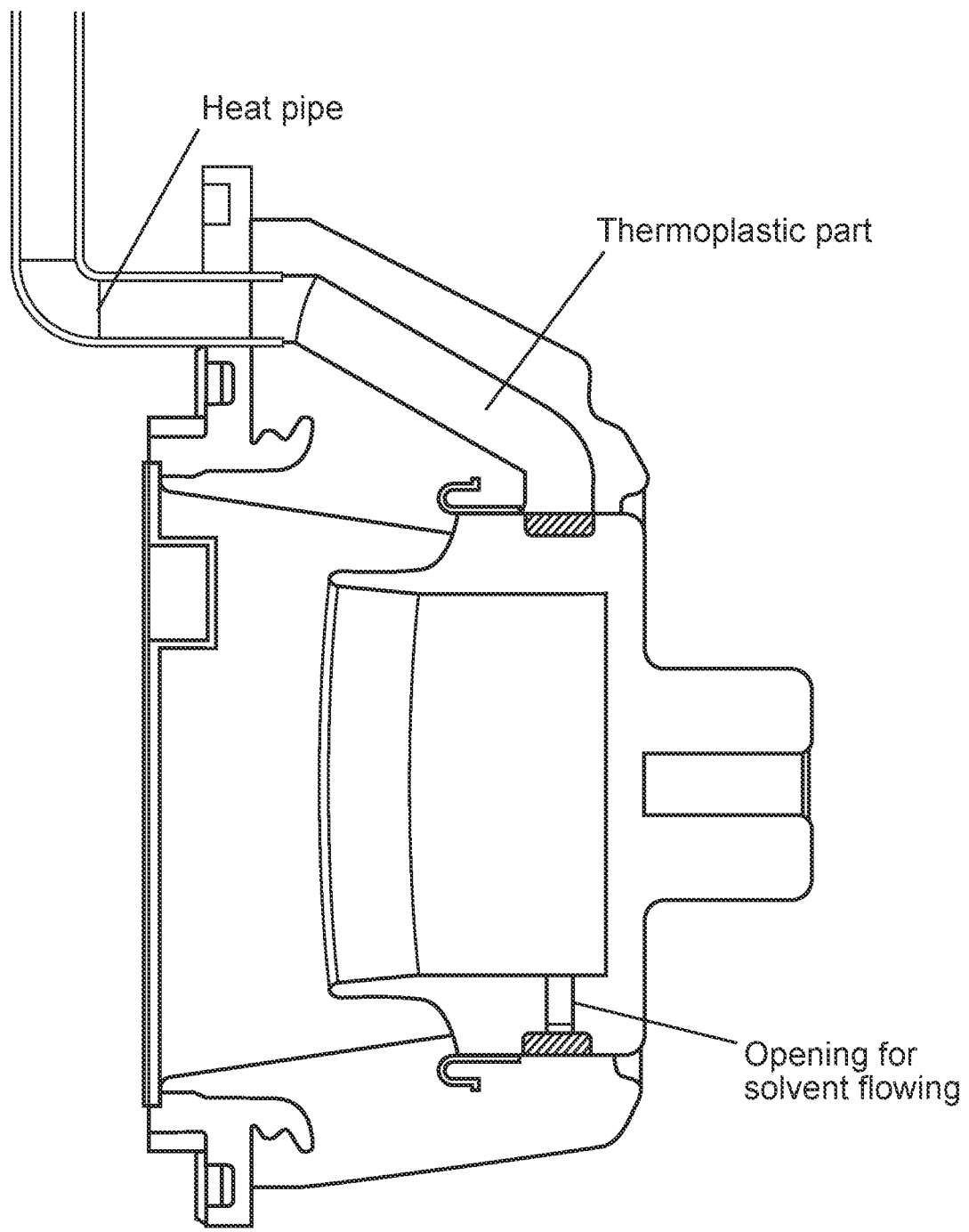
FIG. 3 shows an example of an evaporation section surrounding a current carrying contact.
Figure 4:
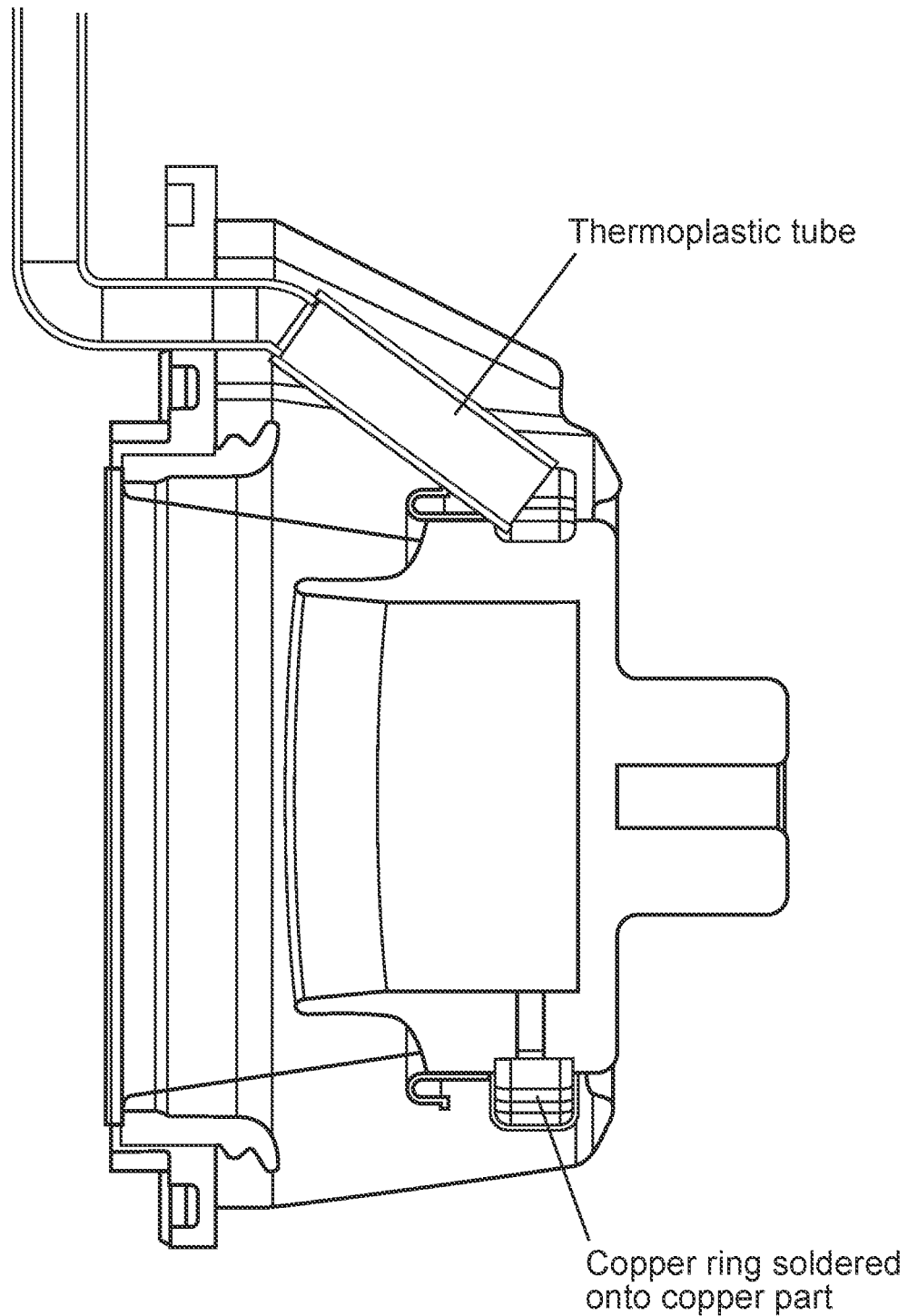
FIG. 4 shows an example of an evaporation section surrounding a current carrying contact.

FIGS. 2-4 relate to cooling apparatuses for a medium voltage or high voltage switchgear, methods of cooling at least one part of a medium voltage or high voltage switchgear with a cooling apparatus, and a method of forming an evaporator section of a cooling apparatus for a medium voltage or high voltage switchgear. The cooling apparatus is described with respect to the cooling of a current carrying contact of a switchgear, but can be used to cool all manner of parts that form "hot spots" in electrical equipment.

In an example of the cooling apparatus for a medium voltage or high voltage switchgear the cooling apparatus comprises an evaporator section, a fluid conduit, and a condenser section. The evaporator section is configured to surround at least part of a current carrying contact. The fluid conduit fluidly connects the evaporator section to the condenser section. A section of the fluid conduit is formed within the evaporator section and is electrically insulating and is configured such that fluid can contact an outer surface of the current carrying contact. The cooling apparatus is configured such that in use a working fluid in the evaporator section is heated to a vapour state, and the vapour is transferred by the fluid conduit to the condenser section. The vapour in the condenser section is condensed to the working fluid, and the condensed working fluid is passively returned via the fluid conduit to the evaporator section.

In an example, the current carrying contact is configured to connect to a primary contact, that for example is configured to connect to a terminal of a circuit breaker of the switchgear.

In an example, the evaporator section is ring shaped.

In an example, the section of the fluid conduit formed within the evaporator section has a wall extending through the evaporator section formed from a material of the main body of the evaporator section.

In an example, the section of the fluid conduit formed within the evaporator section has a wall extending through the evaporator section formed from a material different to a material of the main body of the evaporator section.

In an example, the section of the fluid conduit formed within the evaporator section is formed from an electrically insulating tube.

In an example, the evaporator section comprises an insulating material such as ceramic and glass materials.

In an example, the evaporator section comprises plastic and/or rubber materials.

In an example, the evaporator section comprises epoxy resin.

In an example, the evaporator section comprises glass-fiber-reinforced epoxy resin.

In an example, the evaporator section comprises copper.

In an example, the working fluid is electrically insulating.

In an example, the working fluid can be a refrigerant such as hydrofluorocarbons (e.g. R134a, R245fa), fluorketones (e.g., NOVEC-649™, NOVEC-5110™ commercially available from 3M), and hydrofluoroethers (e.g., HFE7100™, commercially available from 3M).

According to an example, the cooling apparatus comprises the current carrying contact. The evaporator section surrounds and is fixedly attached to an outer surface of the current carrying contact.

According to an example, a metallic wick is comprised within the fluid conduit.

According to an example, the condenser section is located at a higher elevation than the evaporator section.

According to an example, the evaporator section is electrically insulating.

In an example, the evaporator section comprises epoxy resin.

According to an example, a fluid channel surrounds the current carrying contact. The fluid channel is configured such that the working fluid can contact an outer surface of the current carrying contact that extends around the current carrying contact. The fluid channel fluidly connects to the fluid conduit.

In an example, the fluid channel is comprised within the evaporator section.

In an example, the cooling apparatus comprises the current carrying contact, and the fluid channel is comprised within the evaporator section and/or the current carrying contact.

In an example, the fluid channel comprises a copper tube extending around the current carrying contact.

In an example of the cooling apparatus for a medium voltage or high voltage switchgear, the cooling apparatus comprises an evaporator section, two fluid conduits, and a condenser section. The evaporator section is configured to surround at least part of a current carrying contact. Each of the two fluid conduits fluidly connects the evaporator section to the condenser section. A section of each of the two fluid conduits is formed within the evaporator section and each is electrically insulating and each is configured such that fluid can contact an outer surface of the current carrying contact. The cooling apparatus is configured such that in use a working fluid in the evaporator section is heated to a vapour state, and the vapour is transferred by a first fluid conduit of the two fluid conduits to the condenser section. The vapour in the condenser section is condensed to the working fluid. The condensed working fluid is passively returned via a second fluid conduit of the two fluid conduits to the evaporator section.

In an example, the current carrying contact is configured to connect to a primary contact, that for example is configured to connect to a terminal of a circuit breaker of the switchgear.

In an example, the evaporator section is ring shaped.

In an example, the section of each fluid conduit formed within the evaporator section has a wall extending through the evaporator section formed from a material of the main body of the evaporator section.

In an example, the section of each fluid conduit formed within the evaporator section has a wall extending through the evaporator section formed from a material different to a material of the main body of the evaporator section.

In an example, the section of each fluid conduit formed within the evaporator section is formed from an electrically insulating tube.

In an example, the evaporator section comprises epoxy resin.

In an example, the evaporator section comprises copper.

According to an example, the cooling apparatus comprises the current carrying contact, and the evaporator section surrounds and is fixedly attached to an outer surface of the current carrying contact.

In an example, the evaporator section is integrated with the current carrying contact to form a busbar bushing.

According to an example, a metallic wick is comprised within the second of the two fluid conduits.

In an example, the condenser section is located at a higher elevation than the evaporator section.

In an example, the evaporator section is electrically insulating.

According to an example, a fluid channel surrounds the current carrying contact. The fluid channel is configured such that the working fluid can contact an outer surface of the current carrying contact that extends around the current carrying contact. The fluid channel fluidly connects to the two fluid conduits.

In an example, the fluid channel is comprised within the evaporator section.

In an example, the cooling apparatus comprises the current carrying contact, and the fluid channel is comprised within the evaporator section and/or the current carrying contact.

In an example, the fluid channel comprises a copper tube extending around the current carrying contact.

Thus, an example also relates to a method of cooling at least one part of a medium voltage or high voltage switchgear with a cooling apparatus. The cooling apparatus comprises an evaporator section, a fluid conduit, and a condenser section. The evaporator section is configured to surround at least part of a current carrying contact. The fluid conduit fluidly connects the evaporator section to the condenser section. A section of the fluid conduit is formed within the evaporator section and is electrically insulating and is configured such that fluid can contact an outer surface of the current carrying contact. The method comprises: heating a working fluid in the evaporator section to a vapour state; transferring the vapour by the fluid conduit to the condenser section; condensing the vapour in the condenser section to the working fluid; and passively returning the condensed working fluid via the fluid conduit to the evaporator section.

In an example, the cooling apparatus comprises the current carrying contact, and the evaporator section surrounds and is fixedly attached to an outer surface of the current carrying contact.

In an example, the evaporator section is integrated with the current carrying contact to form a busbar bushing.

In an example, the current carrying contact is configured to connect to a primary contact, that for example is configured to connect to a terminal of a circuit breaker of the switchgear.

In an example, the evaporator section is ring shaped.

In an example, the section of the fluid conduit formed within the evaporator section has a wall extending through the evaporator section formed from a material of the main body of the evaporator section.

In an example, the section of the fluid conduit formed within the evaporator section has a wall extending through the evaporator section formed from a material different to a material of the main body of the evaporator section.

In an example, the section of the fluid conduit formed within the evaporator section is formed from an electrically insulating tube.

In an example, the evaporator section comprises epoxy resin.

In an example, the evaporator section comprises copper.

In an example, a metallic wick is comprised within the fluid conduit.

In an example, the condenser section is located at a higher elevation than the evaporator section.

In an example, the evaporator section comprises epoxy resin.

According to an example a fluid channel surrounds the current carrying contact. The fluid channel is configured such that the working fluid can contact an outer surface of the current carrying contact that extends around the current carrying contact. The fluid channel fluidly connects to the fluid conduit. The method comprises heating the working fluid in the fluid channel to the vapour state.

In an example, the fluid channel is comprised within the evaporator section.

In an example, the cooling apparatus comprises the current carrying contact, and the fluid channel is comprised within the evaporator section and/or the current carrying contact.

In an example, the fluid channel comprises a copper tube extending around the current carrying contact.

Thus, an example also relates to a method of cooling at least one part of a medium voltage or high voltage switchgear with a cooling apparatus. The cooling apparatus comprises an evaporator section, two fluid conduits, and a condenser section. The evaporator section is configured to surround at least part of a current carrying contact. Each of the two fluid conduits fluidly connects the evaporator section to the condenser section. A section of each of the two fluid conduits is formed within the evaporator section and each is electrically insulating and each is configured such that fluid can contact an outer surface of the current carrying contact. The method comprises: heating a working fluid in the evaporator section to a vapour state; transferring the vapour by a first fluid conduit of the two fluid conduits to the condenser section; condensing the vapour in the condenser section to the working fluid; and passively returning the condensed working fluid via a second fluid conduit of the two fluid conduits to the evaporator section.

In an example, the cooling apparatus comprises the current carrying contact, wherein the evaporator section surrounds and is fixedly attached to an outer surface of the current carrying contact.

In an example, the evaporator section is integrated with the current carrying contact to form a busbar bushing.

In an example, the current carrying contact is configured to connect to a primary contact, that for example is configured to connect to a terminal of a circuit breaker of the switchgear.

In an example, the evaporator section is ring shaped.

In an example, the section of each fluid conduit formed within the evaporator section has a wall extending through the evaporator section formed from a material of the main body of the evaporator section.

In an example, the section of each fluid conduit formed within the evaporator section has a wall extending through the evaporator section formed from a material different to a material of the main body of the evaporator section.

In an example, the section of each fluid conduit formed within the evaporator section is formed from an electrically insulating tube.

In an example, the evaporator section comprises epoxy resin.

In an example, the evaporator section comprises copper.

In an example, a metallic wick is comprised within the second of the two fluid conduits.

In an example, the condenser section is located at a higher elevation than the evaporator section.

In an example, wherein the evaporator section comprises epoxy resin.

According to an example, a fluid channel surrounds the current carrying contact. The fluid channel is configured such that the working fluid can contact an outer surface of the current carrying contact that extends around the current carrying contact. The fluid channel fluidly connects to the two fluid conduits. The method comprises heating the working fluid in the fluid channel to the vapour state.

In an example, the fluid channel is comprised within the evaporator section.

In an example, the cooling apparatus comprises the current carrying contact, and the fluid channel is comprised within the evaporator section and/or the current carrying contact.

In an example, the fluid channel comprises a copper tube extending around the current carrying contact.

Thus, an example also relates to a method of forming an evaporator section of a cooling apparatus for a medium voltage or high voltage switchgear. The cooling apparatus comprises the evaporator section, at least one fluid conduit, and a condenser section. The evaporator section is configured to surround at least part of a current carrying contact. The at least one fluid conduit fluidly connects the evaporator section to the condenser section. The method of forming the evaporator section comprises: forming a section of the at least one fluid conduit within the evaporator section that is electrically insulating.

In an example, the cooling apparatus comprises the current carrying contact, and wherein the method comprises fixedly attached the evaporator to an outer surface of the current carrying contact.

In an example, method comprises integrating the evaporator section with the current carrying contact to form a busbar bushing.

In an example, the evaporator section is ring shaped.

In an example, the section of the fluid conduit formed within the evaporator section has a wall extending through the evaporator section formed from a material of the main body of the evaporator section.

In an example, the section of the fluid conduit formed within the evaporator section has a wall extending through the evaporator section formed from a material different to a material of the main body of the evaporator section.

In an example, the section of the fluid conduit formed within the evaporator section is formed from an electrically insulating tube.

In an example, the evaporator section comprises epoxy resin.

In an example, the evaporator section comprises copper.

In an example, forming the section of the fluid conduit within the evaporator section comprises forming the evaporator section in a ring shape, and a tube or solid part is placed that extends through the evaporator section corresponding to the section of the fluid conduit within the evaporator section.

In an example, the evaporator section comprises an insulating material, and the method comprises removing the tube or solid part.

In an example, the tube is made from a thermoplastic and removing the tube or solid part comprises heating the tube or solid part and/or washing out the tube or solid part with a solvent (e.g. water, acetone).

In an example, a tube is placed that extends through the evaporator section corresponding to the section of the fluid conduit within the evaporator section. The tube comprises an insulating material, and the tube forms the section of the fluid conduit within the evaporator section, and the evaporator section comprises copper.

In an example, the method comprises forming a fluid channel within the evaporator section. The fluid channel extends around an inner surface of the evaporator section. The fluid channel is configured to open onto an outer surface of the current carrying contact. The fluid channel fluidly connects to the fluid conduit.

In an example the cooling apparatus comprises the current carrying contact, and the method comprises forming a fluid channel within the current carrying contact. The fluid channel extends around an outer surface of the current carrying contact and surrounds the current carrying contact. The method comprises forming the evaporator section around the current carrying contact, and the fluid channel fluidly connects to the fluid conduit.

In an example the cooling apparatus comprises the current carrying contact, and the method comprises forming the evaporator section around the current carrying contact. The fluid channel extends around an inner surface of the evaporator section. The fluid channel is configured to open onto an outer surface of the current carrying contact, and the fluid channel fluidly connects to the fluid conduit In an example, the fluid channel has a surface that is configured to contact the working fluid that is from the same material as the material of the main body of the evaporator section In an example, the fluid channel comprises a copper tube extending around the current carrying contact.

In an example, forming the fluid channel within the evaporator section comprises forming the evaporator section in a ring shape, and wherein a tube or solid ring is placed that extends around the evaporator section corresponding to the fluid channel within the evaporator section.

In an example, the evaporator section comprises an insulating material, and the method comprises removing the tube or solid ring.

In an example, the tube or ring is made from a thermoplastic and removing the tube or ring comprises heating the tube or ring and/or washing out the tube or ring with a solvent (e.g. water, acetone).

In an example, the evaporator section comprises copper, and forming the fluid channel within the evaporator section comprises forming the evaporator section in a ring shape. The method comprises placing a tube of electrically insulating material that extends around the evaporator section corresponding to the fluid channel within the evaporator section.

In an example, the method comprises forming an opening through a wall of the current carrying contact from the fluid channel to a hollow centre of the current carrying contact. The method comprises removing the tube or solid part that forms part of the section of fluid conduit or the fluid channel by heating the associated tubes or solid parts and/or washing out the associated tubes or solid parts with a solvent (e.g. water, acetone), such that at least some material flows through the opening.

Thus in an example, there a switchgear can comprise one or more of the above described cooling apparatus.

The cooling apparatuses for a medium voltage or high voltage switchgear, methods of cooling at least one part of a medium voltage or high voltage switchgear with a cooling apparatus, and a method of forming an evaporator section of a cooling apparatus for a medium voltage or high voltage switchgear are further described in specific detail, where reference is again made to FIGS. 2-4.

The new technique of cooling involves providing the evaporator section and insulating section of a thermosyphon, and in a specific example both are integrated inside a busbar bushing (hot spot). This way the gas tightness and electrical insulation is provided by the epoxy part itself and no additional bushing or sealings are needed. Also, in this manner the cooling liquid of the heat pipe is in direct contact with the copper part inside the busbar socket and so connected to the hot spot. The heat can be dissipated outside the switchgear compartment to the condenser section. At the same time the heat pipe has no contact to the gas inside the compartment.

FIG. 2 shows an evaporation section, made from epoxy resin, of a cooling apparatus surrounding a current carrying contact, labelled as a conductor. For the electrical insulation a hollow section of the fluid conduit that links the evaporation section to the condenser section is provided inside the epoxy part. Forming a fluid channel or void in a ring shape, labelled as ring shaped contact area, allows the liquid to flow around the copper part providing very good heat extraction. A thermoplastic part is made either by injection molding or by 3D printing that is sensitive with respect to solvent (for example water, acetone). This part is placed in the mold during the epoxy casting of the bushing and is then washed out (see FIG. 3), the washing out can involve heating of the thermoplastic part to high temperatures to melt it and it can then flow out, with or without the use of a solvent. Such thermoplastic materials are known from 3D printing process as they are usually used as support structure (e.g. polyvinyl alcohol). In case the channel is produced in a form of hollow (e.g. tubular, honey comb) shape the flowing of the solvent is improved and the dissolving process will be more efficient. A small opening at the bottom of the copper part simplifies the flowing through the thermoplastic section. The opening is soldered after the removal of the thermoplastic material.

As shown in FIG. 4, rather than make the evaporator section from an insulating material, a section of the fluid conduit that links the evaporator section to the condenser section is made from an insulating material that is left in position. Thus, in the assembled solution shown in FIG. 4 a thermoplastic tube that is electrically insulating remains in the socket. The ring shaped void, the fluid channel to aid cooling through flow of working fluid, around the copper part is provided by a nut in the copper part and a copper ring that is soldered on the conductor.

Additionally, rather than use just one fluid conduit linking the evaporator section to the condenser section a closed loop consisting of two or more tubes can be used to allow a circulation of the liquid and gaseous phase of the fluid, thereby improving efficiency.

While one or more embodiments of the invention have been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings and the disclosure.

While one or more embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A cooling apparatus for a medium voltage or high voltage switchgear, the cooling apparatus comprising:
   an evaporator section;
   a fluid conduit; and
   a condenser section,
   wherein, the evaporator section comprises epoxy that completely surrounds a current carrying contact to provide electrical insulation,
   wherein, the fluid conduit fluidly connects the evaporator section to the condenser section,
   wherein, a section of the fluid conduit is formed and entirely enclosed within the evaporator section around the current carrying contact, and is electrically insulating by the epoxy,
   wherein, the cooling apparatus is configured such that, in use, a working fluid in the evaporator section is heated to a vapour state by direct physical contact with the current carrying conductor, and wherein the vapour is transferred by the fluid conduit to the condenser section, and wherein the vapour in the condenser section is condensed to the working fluid, and wherein the condensed working fluid is passively returned via the fluid conduit to the evaporator section, and
   wherein the section of the fluid conduit formed within the evaporator section is configured to direct at least a portion of the working fluid into direct physical contact with an outer surface of the current carrying contact.

2. The cooling apparatus according to claim 1, wherein the current carrying contact is included in the cooling apparatus, wherein the evaporator section surrounds and is fixedly attached to the outer surface of the current carrying contact.

3. The cooling apparatus according to claim 1, wherein a metallic wick is comprised within the fluid conduit.

4. The cooling apparatus according to claim 1, wherein the condenser section is located at a higher elevation than the evaporator section.

5. The cooling apparatus according to claim 1, wherein the evaporator section is electrically insulating.

6. The cooling apparatus according to claim 1, wherein a fluid channel surrounds the current carrying contact, wherein the fluid channel is configured such that, in use, the working fluid thermally contacts the outer surface of the current carrying contact that extends around the current carrying contact, and wherein the fluid channel fluidly connects to the fluid conduit.

7. A method of cooling at least one part of a medium voltage or high voltage switchgear with a cooling apparatus, the cooling apparatus comprising:
   an evaporator section;
   a fluid conduit; and
   a condenser section,
   wherein, the evaporator section comprises epoxy completely surrounding a current carrying contact, the epoxy forming a fluid channel that is in direct physical contact with the current carrying contact,
   wherein, the fluid conduit fluidly connects the evaporator section to the condenser section,
   wherein, the fluid channel is a section of the fluid conduit that is formed and entirely enclosed within the evaporator section and is electrically insulating,
   wherein, the method comprises:
      heating a working fluid in the evaporator section to a vapour state;
      transferring the vapour by the fluid conduit to the condenser section;
      condensing the vapour in the condenser section to the working fluid; and
      passively returning the condensed working fluid via the fluid conduit to the evaporator section, and
      wherein the fluid channel is configured to direct at least a portion of the working fluid into direct physical contact with an outer surface of the current carrying contact.

8. The method according to claim 7, wherein a fluid channel surrounds the current carrying contact, wherein the fluid channel is configured such that, in use, the working fluid thermally contacts the outer surface of the current carrying contact that extends around the current carrying contact, and wherein the fluid channel fluidly connects to the fluid conduit; and wherein the method comprises heating the working fluid in the fluid channel to the vapour state.

* * * * *